United States Patent Office 3,410,748
Patented Nov. 12, 1968

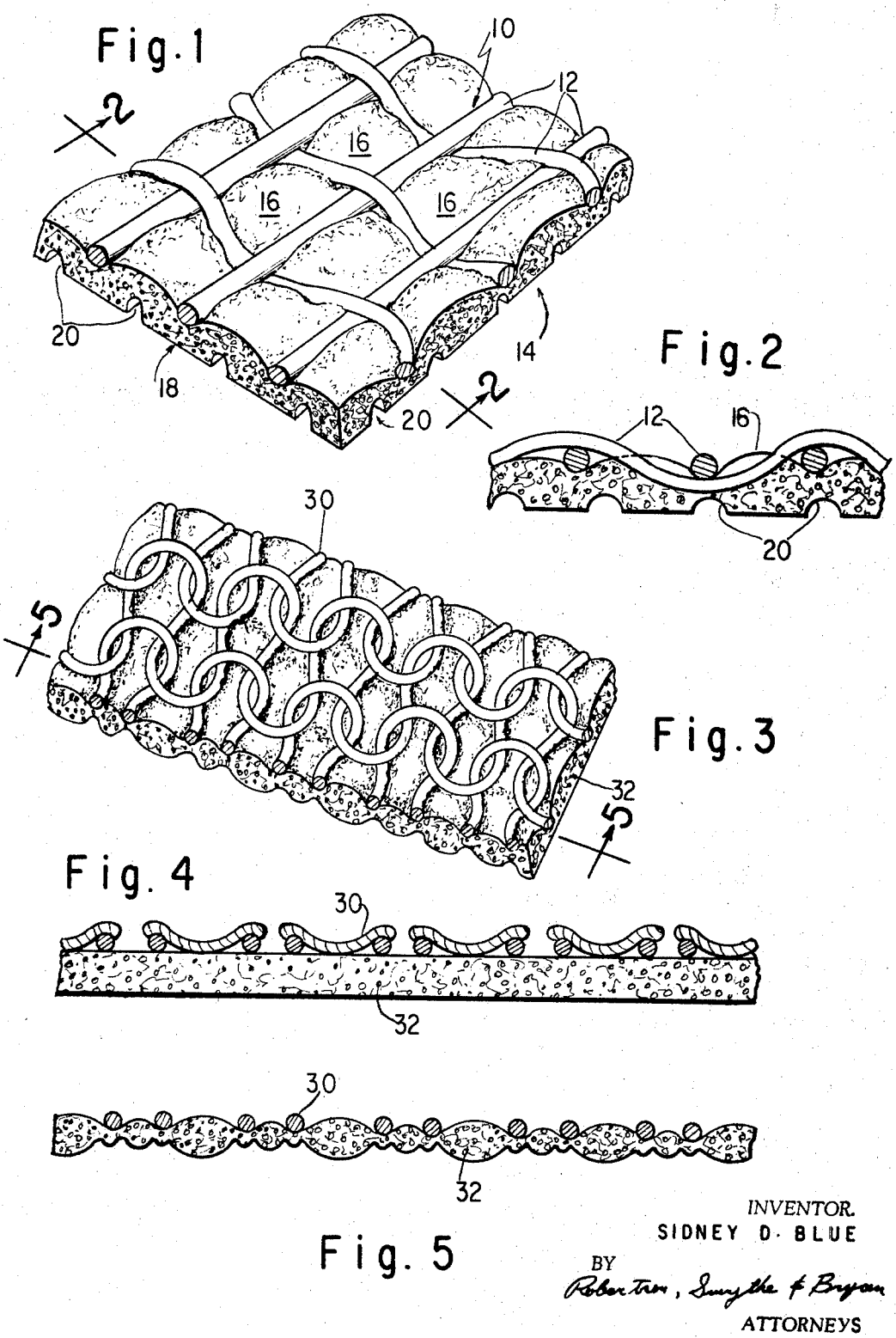

3,410,748
METHOD OF BONDING POROUS POLYURETHANE TO LOOSELY WOVEN FABRIC AND RESULTANT ARTICLE
Sidney D. Blue, New York, N.Y., assignor to Reeves Brothers, Inc., New York, N.Y., a corporation of New York
Filed Mar. 4, 1964, Ser. No. 349,362
3 Claims. (Cl. 161—76)

ABSTRACT OF THE DISCLOSURE

The disclosure is directed to a method for producing a stabilized fabric where the fabric is composed of a fabric web to which there is adhered a layer of polyurethane foam of the polyester type, and in which the polyurethane foam has been elastically and permanently compressed over the yarn of the fabric at a multiplicity of spaced positions to provide a composite fabric of low bulk.

The process for producing such a fabric is done by causing the fabric web to be laminated by any of the usual methods to the polyurethane foam, and the composite fabric and foam is then compressed with a heated element against the surface of the foam at a temperature in the range of 300° F. to 400° F.

---

This invention relates in general to a fabric and more specifically it relates to a fabric which has been dimensionally stabilized with a sheet of flexible polyurethane foam plastically molded on one face thereof.

Many loosely woven and knitted materials are subject to stretching and, at times, distortion in use and such materials often do not easily return to their original shape. Accordingly, fabrics have been made out of specially treated yarns to impart elastic stretchability to them. There is no conventional standard existing in the textile field today for determining whether or not a fabric is a "stretch" or elastically stretchable fabric; however, if a fabric has the ability to be stretched at least fifteen percent (15%) beyond its original dimension in at least one direction and elastically return to shape, it would be highly desirable and could properly be called a "stretch" fabric.

The special yarns necessary to create "stretch" fabrics, whether they be used in knitted or woven cloth, are expensive and the equipment necessary to utilize them is special and, therefore, additionally expensive.

Other fabrics which have a stretchable characteristic have been provided by utilizing special treatment of them during finishing, but most of these methods produce fabrics of only limited elastic recovery.

Webs of textile fabrics whether they have an appreciable "stretchability" characteristic or not, should have the physical characteristics of being dimensionally stable, strong and drapeable while providing good thermal insulation.

In recent years, woven and knitted materials have been increasingly used with a thin sheet of polyurethane foam adhered thereto. Materials upon being treated in this manner have been given some increased dimensional stability and thermal insulation. Laminates of this type have become very popular in the textile apparel field especially in outerwear. The relative thickness of the foam to that of the fabric, in some instances, may cause the resulting laminate to have relatively poor draping characteristics, i.e., the ability to readily fall upon being draped over an object. The relative bulkiness of the foam would appear to be a major reason for such poor drapeability.

Keeping in mind that it is desirable to have a fabric of minimum bulk and maximum stretchability, the present invention provides a stabilized fabric in which a fabric web having interstices has adhered to it a sheet of flexible polyurethane foam permanently bonded to one face of the web and molded into the interstices over the elements of the face of the fabric web with the foam being permanently compressed at a multiplicity of spaced positions.

Additionally, the stabilized fabric with the molded foam on one face is provided with a repeated design formed on the exposed face of the foam by portions of permanently compressed foam.

Moreover, the invention contemplates a stabilized fabric web having the ability to elongate at least fifteen percent (15%) beyond its original size in at least one direction, has adhered to it a sheet of flexible polyurethane foam which is plastically molded onto one face of the web to impart an elastically stretchable character to the fabric.

The invention further provides a process for making stabilized fabrics in which there is applied, simultaneously, heat and pressure to a laminate of fabric web and flexible polyurethane foam to mold the foam into the interstices of the fabric web and plastically compress the foam at a multiplicity of spaced positions.

A stabilized fabric according to the invention may be made, for example, by taking a bulky knitted material that is formed with a loose interlocking stitch or loose woven material which has the ability to stretch in any direction fifteen percent (15%) or more of its original dimension. To this fabric web, there is permanently adhered a sheet of flexible polyurethane foam having a thickness of about 3/32 of an inch. The adhering may be done by any of the well known heat or adhesive processes. The urethane-fabric laminate resulting from those processes is thereafter subjected to pressure, and simultaneously heat is applied to the exposed foam face in a range of 300° to 400° F. and preferably about 370° F. to plastically mold the foam over the contacting surfaces of the fiber elements of the fabric web face.

This process not only molds the foam, but causes portions of the foam to be pushed into the interstices of the fabric web. As illustrated in FIGURE 6 of the accompanying drawing, it is preferable that the pressure and heat are applied by passing the fabric-foam laminate between the rolls of a calendering machine in which there are opposing rolls causing the laminate to be compressed during its passage therethrough. One of the rolls is heated and maintained at the specified temperature while the laminate is passed through the machine at a speed of 250 yards per hour with the heated roll in contact with the foam. Preferably, the machine would have a heated metal roll and a hard paper-filled compressing roll, as shown in FIGURE 6. Such a machine is set up with the heated roll in hard contact with the paper-filled roll prior to having the laminate fed therebetween.

The resulting product is characterized by not being substantially thicker than the textile fabric prior to such treatment. The foam face of the resulting stabilized fabric has a multiplicity of points or portions where the foam has been plastically deformed or molded into the interstices of the fabric. Such a treated polyurethane, being no longer a true foam, can be described as being a molded sheet of porous polyurethane. Thus, some portions of the foam are permanently compressed and others just displaced inwardly into such interstices as shown in FIGURE 1 of the accompanying drawing. Moreover, the foam surface appears to have taken the pattern of the weave or knit of the fabric onto which it is molded.

For example, it has been found that if the heated roll of the calender has its surfaces engraved in a pattern of fine mesh or screen with grooves approximately .010" deep and .020" wide with them being spaced apart approximately .020" with the grooves engraved circumferentially and longitudinally on the roll to form a mesh design of approximately twenty-five squares per inch in both directions or six hundred twenty-five squares per inch, the stabilized fabric has the foam which, in addition to being molded, may have indentations thereinto with plastic compression in a repeated design conforming to the design of the roll. The result appears to be that the elements which make up the fabric web, be they fiber or yarn in non-woven, woven or knitted materials, have the polyurethane foam molded around their exposed face. Accordingly, should the foam be delaminated, an examination of the delaminated surface of the foam will show that there has been impressed thereon in bas-relief, the surface design of the textile fabric.

It is believed that the product when made by the above-described process has the elements that make up the textile fabric, be they fiber or yarn, elastically compressed with the foam being pressed over and partially around such elements. The heating of the polyurethane foam seems to produce a permanent compression of some of the open cells of the foam, particularly at the faces of these elements, while the other portions of the foam are pushed and displaced into the interstices of the fabric. Thus, when the pressure and the heat is released, the foam has taken a permanent or plastic compression at a multiplicity of spaced positions while the elastic elements of the fabric web return to their original shape.

Other advantages, objects and features obtained by use of the invention will be apparent from the following description and drawings which are merely exemplary.

In the drawings:

FIGURE 1 is a perspective view of a woven fabric in accordance with the present invention;

FIGURE 2 is a section of the fabric taken along the line 2—2 of FIGURE 1;

FIGURE 3 is a perspective view of a knitted fabric in accordance with the present invention;

FIGURE 4 is a vertical section of the fabric of FIGURE 3 prior to compressing the foam thereon;

FIGURE 5 is a vertical section taken along line 5—5 of FIGURE 3; and

Figure 6:
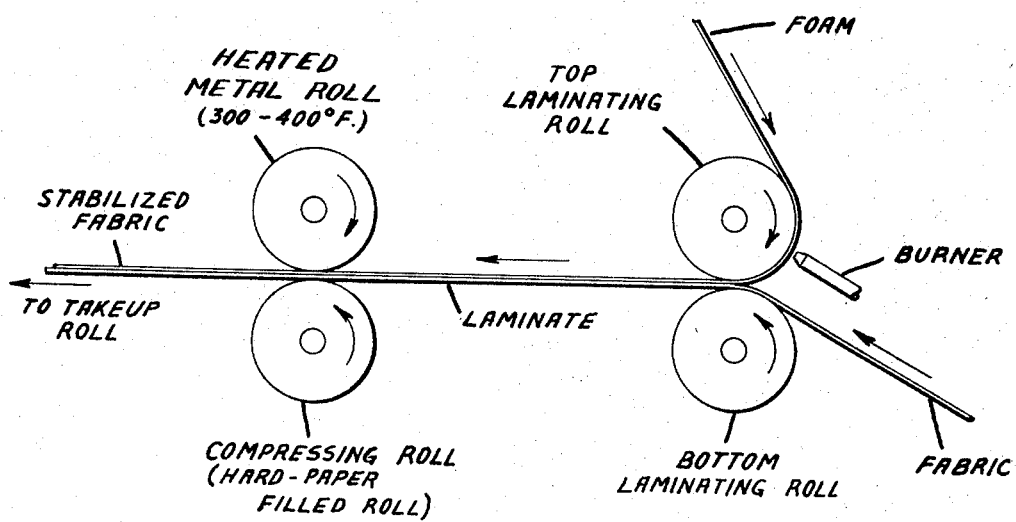
FIGURE 6 is a schematic view of a flame laminating apparatus and heated metal and compressing rolls, illustrating a process for making a stabilized fabric in accordance with the present invention.

FIGURES 1 and 2 illustrate the invention by showing a loosely woven fabric 10 having woven yarn 12 in an extremely loose weave to better show the product. The face of the fabric web 10 has permanently adhered thereto, a sheet 14 of porous or foamed polyurethane in which certain portions 16 have been pushed during molding into the interstices of the fabric web 10 while certain portions 18 of the polyurethane are permanently and plastically compressed over the yarn 12 and thus is compressed at a multiplicity of spaced positions. Further, where the compression molding of the foam 14 is done with an embossed roll (as aforesaid, the foam 14 has a further group of plastically compressed portions 20 that correspond to the repeated pattern of the bands of the embossed roll.

FIGURES 3, 4, and 5 illustrate the invention applied to a knitted material 30 in which the knitted material is illustrated as a very loose knit to better show and to some extent exaggerate the physical features of the product. The face of the knitted material 30 has a thin sheet 32 of foamed polyurethane permanetly adhered thereto. Prior to permanent compression of the combined knitted material and foam, they appear as shown in FIGURE 4. However, once the polyurethane sheet 32 has been plastically compressed over the loops of the knit 30, the foam 32 becomes permanently compressed at a multiplicity of spaced positions adjacent the yarn loops (see the section shown in FIGURES 3 and 5).

The fabrics shown in the illustrations have their interstices greatly exaggerated to emphasize the molding of the foam.

Most of the present commercially available formulations of the polyether polyurethane do not permanently crush by the method herein cited, whereas the known polyester types do crush. Accordingly, the phrase "polyurethane foam of the polyester type" is intended to mean any polyurethane which will crush under the conditions specified and claimed herein, irrespective of the chemical classification of the foam. The statement is based on the inventor's understanding that the classification of polyester and polyether is not completely definitive of all properties of the urethane foams. It is his belief that the ability of the urethane foam to take a permanent set upon the application of heat and pressure, controls on whether a particular formulation of urethane will or will not operate within the scope of this disclosure and claims.

The types of base fabrics that can be used in the invention are apparently unlimited. Woven, knitted and non-woven fabric webs, all will serve as a mold base for the foam, with the resulting stretchability being determined by the characteristics of the selected fabric web. The important feature being that by this invention all fabrics that stretch at least 15% in one direction can now be made elastically "stretchable."

The elastic stretchability which is imparted to the fabric according to the invention herein, is due in part to the fact that the polyurethane foam of the type described has an elasticity such that it may be stretched to between 300% and 500% of its original dimension without plastic deformation. As the base fabric web to which the foam is molded has a maximum stretchability which is usually less than 300% to 500% of its original dimension, the product of the present invention has its stretch characteristics determined by the amount to which the base fabric may be stretched without permanent distortion. Thus, the dimensional stability is supplied by the urethane which, because it has been molded onto one face of the fabric, has a reduced bulk and thus yields good drapeability of the resultant fabric.

While in accordance with the provisions of the statutes there has been illustrated and described herein a specific form of the invention now known, those skilled in the art will understand that changes may be made in the form of the product or the method of making it disclosed without departing from the spirit of the invention covered by the claims and that certain features of the invention may sometimes be used to advantage without a corresponding use of other features.

What is claimed is:

1. A process for making a stabilized loosely woven or bulky-knit fabric having interstices through which the foam may protrude comprising adhering a sheet of flexible polyurethane foam of the polyester type to one face of a fabric web, said foam having a thickness in the order of 3/32 of an inch, compressing said polyurethane against said fabric web with a heated compressing element against the surface of said foam at a temperature within the range of 300 to 400° F. to plastically and permanently compress said foam and to mold said foam over the yarn at a multiplicity of spaced positions, while always maintaining the porous nature of said foam.

2. A stabilized fabric made according to claim 1 in which said foam is molded into the interstices of said fabric.

3. A stabilized fabric made according to claim 1 in which the fabric web has the ability to stretch at least 15 percent beyond its original size in at least one direction to thereby produce a recoverably stretchable fabric.

(References on following page)

References Cited

UNITED STATES PATENTS

| | | | |
|---|---|---|---|
| 3,061,460 | 10/1962 | Schickedanz | 117—98 |
| 2,957,793 | 10/1960 | Dickey | 156—82 |
| 3,251,727 | 5/1966 | Reynolds et al. | 161—148 |

FOREIGN PATENTS

| | | |
|---|---|---|
| 813,311 | 5/1959 | Great Britain. |
| 1,259,517 | 3/1961 | France. |
| 221,280 | 10/1961 | Austria. |

JACOB H. STEINBERG, *Primary Examiner.*